(12) United States Patent
Sagae

(10) Patent No.: US 7,169,735 B2
(45) Date of Patent: Jan. 30, 2007

(54) CATALYST AND PROCESS FOR PREPARING THE SAME

(75) Inventor: Takeyuki Sagae, Kanagawa (JP)

(73) Assignee: Tanaka Kikinzoku Kogyo K.K., Tokyo (JP)

(*) Notice: Subject to any disclaimer, the term of this patent is extended or adjusted under 35 U.S.C. 154(b) by 0 days.

(21) Appl. No.: 11/119,823

(22) Filed: May 3, 2005

(65) Prior Publication Data
US 2005/0261125 A1  Nov. 24, 2005

(30) Foreign Application Priority Data
May 24, 2004 (JP) .............. 2004-152984

(51) Int. Cl.
 B01J 23/00 (2006.01)
 B01J 23/40 (2006.01)
 B01J 23/44 (2006.01)
 B01J 23/56 (2006.01)
 B01J 23/58 (2006.01)

(52) U.S. Cl. .............. 502/326; 502/240; 502/243; 502/261; 502/262; 502/327; 502/330; 502/332; 502/333; 502/334; 502/339; 502/344; 502/347; 502/348; 502/349; 502/350; 502/351; 502/355; 502/415; 502/439

(58) Field of Classification Search .......... 502/240, 502/243, 261, 262, 326, 327, 330, 332–334, 502/339, 344, 347–351, 355, 415, 439
See application file for complete search history.

(56) References Cited

U.S. PATENT DOCUMENTS

| | | | |
|---|---|---|---|
| 3,956,190 A | * | 5/1976 | Sinfelt .............. 502/230 |
| 3,956,191 A | * | 5/1976 | Cusumano .............. 502/330 |
| 3,972,830 A | * | 8/1976 | Bryce-Smith et al. ..... 502/167 |
| 4,219,447 A | * | 8/1980 | Wheelock .............. 502/333 |
| 4,252,678 A | * | 2/1981 | Smith .............. 502/5 |

(Continued)

FOREIGN PATENT DOCUMENTS

EP 0 904 835 A2 3/1999

(Continued)

OTHER PUBLICATIONS

Toshima et al., "Polymer-protected Palladium-Platinum Bimetallic Clusters: Preparation, Catalytic Properties and Structural Considerations", J. Chem. Soc. Faraday Trans., 1993, 89 (14), 2537-2543.

Primary Examiner—Cam N. Nguyen
(74) Attorney, Agent, or Firm—Rothwell, Figg, Ernst & Manbeck

(57) ABSTRACT

The object of the present invention is to provide a catalyst that is highly active and capable of maintaining its activity for a long period of time even in a high-temperature environment. The present invention is a catalyst including: a porous carrier which is comprised of one kind of or two or more kinds of metal oxides; and catalyst particles which are comprised of precious metals or precious metal oxides and supported on the above porous carrier, characterized in that the catalyst particles include: clustered particles formed by the aggregation of first precious metal atoms; and second precious metal ions bound to the above clustered particles. Preferably, the first precious metal and the second precious metal are different metal species which are selected from the group consisting of platinum, palladium, rhodium, ruthenium, silver, gold, iridium and osmium.

16 Claims, 4 Drawing Sheets

U.S. PATENT DOCUMENTS

| | | | |
|---|---|---|---|
| 4,469,816 A * | 9/1984 | Armor et al. | 502/333 |
| 4,797,380 A * | 1/1989 | Motoo et al. | 502/159 |
| 5,275,998 A * | 1/1994 | Tsurumi et al. | 502/339 |
| 5,275,999 A * | 1/1994 | Tsurumi et al. | 502/339 |
| 6,074,979 A * | 6/2000 | Hagemeyer et al. | 502/159 |
| 6,180,222 B1 * | 1/2001 | Schulz et al. | 428/317.9 |
| 6,197,720 B1 * | 3/2001 | Heineke et al. | 502/325 |
| 6,306,795 B1 * | 10/2001 | Ryan et al. | 502/346 |
| 6,372,687 B1 * | 4/2002 | Hagemeyer et al. | 502/326 |
| 6,462,095 B1 * | 10/2002 | Bonsel et al. | 516/97 |
| 6,489,258 B1 * | 12/2002 | Ying et al. | 502/60 |
| 6,524,991 B2 * | 2/2003 | Bowman et al. | 502/242 |
| 6,603,038 B1 * | 8/2003 | Hagemeyer et al. | 560/241.1 |
| 6,716,525 B1 * | 4/2004 | Yadav et al. | 428/402 |
| 6,720,284 B1 * | 4/2004 | Plzak | 502/330 |
| 6,740,615 B2 * | 5/2004 | Zhou | 502/29 |
| 6,908,873 B2 * | 6/2005 | Zhou et al. | 502/29 |
| 6,911,412 B2 * | 6/2005 | Hampden-Smith et al. | 502/180 |
| 6,984,607 B2 * | 1/2006 | Kuperman et al. | 502/344 |
| 2002/0107140 A1 * | 8/2002 | Hampden-Smith et al. | 502/185 |
| 2002/0115554 A1 * | 8/2002 | Zhou | 502/28 |
| 2003/0012942 A1 * | 1/2003 | Larsen et al. | 428/304.4 |
| 2003/0092921 A1 * | 5/2003 | Stangland et al. | 549/533 |
| 2003/0100778 A1 * | 5/2003 | Cunningham et al. | 549/533 |
| 2003/0139594 A1 | 7/2003 | Capan et al. | |
| 2003/0187294 A1 * | 10/2003 | Hagemeyer et al. | 560/241 |
| 2003/0216245 A1 * | 11/2003 | Zhou et al. | 502/22 |
| 2004/0171480 A1 * | 9/2004 | Hampden-Smith et al. | 502/102 |
| 2004/0176620 A1 * | 9/2004 | Kuperman et al. | 549/533 |
| 2005/0095189 A1 * | 5/2005 | Brey et al. | 423/427 |
| 2005/0148464 A1 * | 7/2005 | Reetz et al. | 502/352 |
| 2006/0052241 A1 * | 3/2006 | Airiau et al. | 502/304 |

FOREIGN PATENT DOCUMENTS

| | | |
|---|---|---|
| EP | 1 043 065 A1 | 10/2000 |
| EP | 0 911 900 A2 * | 4/2004 |
| JP | 58-122044 A | 7/1983 |
| JP | 63-116741 A | 5/1988 |

* cited by examiner

Atomic catalyst particles

Immediately after preparation → After heating at high temperature

- Pt atom
- Pd atom
- Pd oxide

Clustered catalyst particles

Immediately after preparation → After heating at high temperature

CATALYST AND PROCESS FOR PREPARING THE SAME

BACKGROUND OF THE INVENTION

FIELD OF THE INVENTION

The present invention relates to a catalyst, particularly to a catalyst which is capable of maintaining high catalytic activity for a long period of time and suitably used in applications such as exhaust gas purification, and a process for preparing the same.

DESCRIPTION OF THE RELATED ART

Catalysts having been used in various fields include those prepared by impregnating a porous oxide carrier, such as alumina or silica, with one kind of or two or more kinds of solutions of precious metal salts, such as dinitrodiamine-platinum, chloroplatinic acid or rhodium nitrate, and then calcining the carrier impregnated with metal salt solutions in a reducing atmosphere. In the catalysts prepared as above, when the carrier is impregnated with metal salt solutions, ionized metals are adsorbed on the surface of the carrier, and the ionized metals on the carrier are formed into catalyst particles by the subsequent heat treatment.

[Patent Document 1] Japanese Patent Publication No. 60-50491

[Patent Document 2] Japanese Patent Laid-Open No. 63-116741

Environments in which catalysts are used have become harsher and harsher in recent years. For example, in catalysts for exhaust gas purification, consideration is being given to positioning such a catalyst closer to an engine, right under a manifold, to meet the strengthening of the enforcement of restrictions on exhaust gas, which has resulted from a desire to protect global environment. When cars run at high speed, the exhaust gas temperature becomes as high as 800° C. or more, and catalysts arranged in such a position are exposed to a harsh environment of high temperatures.

Thus, catalysts are demanded which are capable of maintaining high catalytic activity for a long period of time even under a high-temperature atmosphere; however, no conventional catalysts fully meet this demand. Specifically, in conventional catalysts, once they are placed under a high-temperature atmosphere, their catalyst particles are made free from binding by their carrier and allowed to move, and moving catalyst particles in turn come into contact with other particles and aggregate to form coarser particles. This lowers the activity of the catalysts as a whole. Particularly in catalysts using alumina or silica as a porous carrier, their activity is hard to maintain, because both alumina and silica have smaller binding force on catalytic metals, and therefore are more likely to allow the movement of catalytic metal particles when the catalysts are used under heat.

Furthermore, there has always been needed improvement in catalytic activity in the fields of catalysts. In this respect, though many of conventional catalysts are highly active, there are still strong demands for development of catalysts with catalytic activity higher than that of conventional ones.

The present invention has been made in the light of the above described background. Accordingly, its object is to provide a catalyst which is highly active and capable of maintaining its activity even under a high-temperature environment.

SUMMARY OF THE INVENTION

In order to overcome the above described problems, the present inventors first struggled to improve the state in which catalyst particles are supported on a carrier. In the above described conventional catalysts, ionized precious metals are supported on a carrier as precursors of catalyst particles, and then the precursors are heated in a reducing atmosphere so that they are formed into catalyst particles comprised of precious metal in the form of atoms. On the other hand, the present inventors have thought it preferable that catalyst particles take the form of a cluster comprised of preferable number of precious metal atoms.

Employing catalyst particles in the form of a cluster certainly contributes to improvement of catalyst activity; however, its effect on improvement in durability of catalysts may be small. This is because no matter how much the size of catalyst particles is regulated, the movement and the aggregation of catalyst particles may not be fully inhibited. So then, the present inventors made a further examination from the standpoint of improvement in durability. As a result, they came up an idea that the durability of catalysts is possibly improved if catalyst particles are formed by binding precious metal ions to precious metal particles in the form of a cluster. And they finally accomplish the present invention.

Specifically, the present invention is a catalyst including: a porous carrier which is comprised of one kind of or two or more kinds of metal oxides; and catalyst particles which are comprised of precious metals or precious metal oxides and supported on the above porous carrier, characterized in that the catalyst particles include: cluster-particles formed by the aggregation of first precious metal atoms; and second precious metal ions bound to the above clustered particles.

The durability improving process of a catalyst in accordance with the present invention will be described. FIG. 1 illustrates catalyst particles of a catalyst, as one example of catalysts in accordance with the present invention, prepared using platinum for the precious metal (first precious metal) particles in a cluster form and palladium for the precious metal (second precious metal) ions. FIG. 1(A) shows the catalyst immediately after its preparation in which a plurality of palladium ions is bound to a cluster of platinum particles formed by the aggregation of platinum atoms. Once the catalyst is heated, the palladium ions are formed into oxide particles, that is, palladium oxide particles, as shown in FIG. 1(B). Such a change in palladium ions occurs even at low temperatures (around 450° C.) at which conventional catalysts are heat treated in their preparation process.

In the catalysts in such a state, if the atmospheric temperature (reaction temperature) is elevated (e.g. to 800° C. or higher), the catalyst particles start to move. In the catalyst in accordance with the present invention, however, even if the catalyst particles move and aggregate, the platinum particles themselves are inhibited from aggregate due to the palladium oxide particles existing around each cluster of platinum particles, thereby the particle size of the cluster of platinum particles is maintained. As a result, the platinum particles can be kept in a preferably dispersed state (FIG. 1(C)).

In contrast with the above described behavior of the catalyst in accordance with the present invention, neither conventional catalysts, in which precious metal particles in an atomic form are supported as catalyst particles, nor catalysts in which only clusters of precious metal particles are supported as catalyst particles behave like that, and therefore neither of them produce effects like the catalyst in accordance with the present invention. Specifically, in both conventional catalysts and catalysts in which only clusters of precious metal particles are supported as catalyst particles, grain growth occurs in the catalyst particles after heating at high temperatures, and in addition to, the arrangement of the precious metal particles constituting the catalyst particles becomes random, as the aspects of these types of catalysts are shown in FIG. 2. This results in lowering of the catalyst activity.

As is evident from the above described difference in behavior, in the catalyst in accordance with the present invention, the particle size and dispersibility of the catalyst particles are maintained even in a high-temperature environment. Thus, the catalyst in accordance with the present invention is capable of maintain its activity even in a high-temperature environment. Furthermore, since the catalyst of the invention has supported clusters of precious metal particles, it has high catalytic activity immediately after its preparation. Accordingly, the catalyst in accordance with the present invention is capable of maintaining its high activity even if used immediately after its preparation and at high temperatures.

The particle size of the clustered particles constituting the catalyst particles is preferably 1 to 20 nm. If the size is smaller than 1 nm, the activity of the catalyst becomes almost as low as that of the catalysts which have metal particles in the form of atoms on their carriers, whereas if the size is more than 20 nm, the specific area of the catalyst particles becomes small, and therefore the reaction activity of the catalyst is lowered.

In the catalyst in accordance with the present invention, the first precious metal and the second precious metal that constitute the catalyst particles are preferably any precious metals or precious metal ions selected from the group consisting of platinum, palladium, rhodium, ruthenium, silver, gold, iridium and osmium. The first precious metal and the second precious metal may be the same metal species. In this case, if the particle size of the clustered particles formed of the first precious metal is deficient, the second precious metal particles will make up for the deficiency. Thus, the melting point of the clustered particles is increased, and the effect of inhibiting the movement of the catalyst particles is expected to be produced.

However, it is more preferable that the first precious metal and the second precious metal are different metal species. The reason is that the mechanism of improving the durability of the catalyst in accordance with the present invention is based on forming precious metal oxides around the clusters, and therefore, combining the same metal species is possibly less effective in inhibiting the aggregation of the clustered particles, though the improvement in the catalyst activity can be certainly expected. When combining different precious metal species, examples of preferred combinations include those of platinum, as the first precious metal, and palladium, as the second precious metal; platinum, as the first precious metal, and rhodium, as the second precious metal; and palladium, as the first precious metal, and rhodium, as the second precious metal.

The catalyst in accordance with the present invention can be used with the precious metal bound to the precious metal clustered particles still in the form of ions, because the precious metal ions are changed to precious metal oxides during the use of the catalyst. However, the catalyst may be calcined at 300 to 500° C. before use to form the precious metal ions into precious metal oxides, so that the catalyst can be used with the precious metal bound to the precious metal clustered particles in the form of oxides.

Then, the process for preparing a catalyst in accordance with the present invention will be described. The catalyst in accordance with the present invention is characterized by the following two points: precious metal particles in the form of a cluster are supported on a carrier; and precious metal ions are bound to the clustered particles. Accordingly, to prepare such a catalyst, it is necessary to account for a process that enables the accomplishment of these characteristics.

The process for preparing a catalyst which the present inventors found includes the steps of: preparing a metal salt solution that contains the salt of a first precious metal; dispersing in a solvent the above metal salt solution, an organic matter and a porous carrier comprised of one kind of or two or more kinds of metal oxides to form a composite complex comprised of the first precious metal ions and the organic matter which binds to the first precious metal ions, and further, load the above composite complex on the above porous carrier; reducing the above composite complex-supported carrier to form clustered particles, as an aggregate of precious metal atoms; and impregnating the reduced carrier with a metal salt solution containing the salt of a second precious metal to load the second precious metal ions on the reduced carrier.

The process for preparing a catalyst is characterized in that it does not directly load on a carrier precious metal particles in the form of a cluster, but load on a carrier precious metal ions in an aggregated state and then subjects the precious metal ions supported on the carrier to reduction to form precious metal clustered particles and that it loads another precious metal ions on the same carrier after the above step. In the present invention, in order to form clustered particles on a carrier, a composite complex comprised of precious metal ions and an organic matter, which binds to the precious metal ions, is formed and the composite complex is supported on the carrier. The composite complex is formed, in the step of mixing a solution of a precious metal salt and an organic matter, by allowing the organic matter to chemically or physically bind to the metal ions in such a manner as to trap the metal ions.

There are two reasons that applying such an organic matter-containing composite complex makes it possible to prepare a catalyst in accordance with the present invention. The first reason is that since the precious metal ions in the composite complex are in an aggregated state, as described above, clustered particles, as an aggregate of precious metal atoms, can be easily formed by loading the composite complex on a carrier and subjecting the same to reductive treatment.

The second reason is that applying such an organic matter-containing composite complex makes the carrier suitable to bind the cluster particles formed on it with precious metal ions when intending to load precious metal ions on the carrier. Specifically, on the surface of the carrier, which carries the above composite complex and has been subjected to reductive treatment, there exist clustered particles with the organic matter remaining on their surface. When loading precious metal ions on the carrier, which carries clustered particles containing such an organic matter, the precious metal ions are more likely to coordinately bind to the organic matter due to the binding ability of the organic matter. Thus, the state where precious metal ions and clustered particles are bound together is more likely to occur.

Another advantage of applying a composite complex is that the utilization of catalyst particles or the dispersibility of catalyst particles can be improved. In conventional process for preparing a catalyst in which a solution of a precious metal salt is supported on a carrier, it is precious metal ions that are supported on a carrier, and precious metal ions can go deep into the pores of the carrier. The precious metal ions supported in the depth of the pores are hard to reduce, and they cannot be reduced by heat treatment in a reducing atmosphere. This necessitates using a reducing agent with a strong reducing power or carrying out heat treatment at considerably high temperatures. This in turn increases the energy applied at the time of the reduction operation and causes the catalyst particles on the carrier surface to become coarser, whereby clustered particles having a proper particle size cannot be formed. Thus, the precious metal ions entering deep into the pores are hard to form into effective catalyst particles; as a result, the precious metal supported on the carrier cannot be usefully used.

On the other hand, if clustered particles of precious metal are formed at the beginning and the formed clustered particles are supported on a carrier through the step of dispersing in a solvent, it is possible to overcome the above described problem. This process, however, makes it hard to establish the conditions under which the catalyst particles in a solvent are uniformly supported on the carrier, causing a problem of dispersibility.

In contrast, in the process in accordance with the present invention, the composite complex to which an organic matter coordinately binds cannot enter the pores of a carrier due to its size, and therefore it is supported only on the surface of a carrier, which makes the reduction operation and the cluster-particle formation easier. Furthermore, the solution in which composite complexes are dispersed is a uniform solution, and when supporting such a uniform solution on a carrier, the composite complexes are also supported on the carrier uniformly and in a highly dispersed state. Thus, if reductive treatment is done in such a uniform and highly dispersed state, uniform and highly dispersed precious metal clustered particles can be formed. For the above described reasons, applying the process in accordance with the present invention makes it possible to prepare a catalyst with a highly dispersed catalyst particles, and in addition to, increase the utilization of catalyst particles.

In the following, the steps of the process in accordance with the present invention will be described in detail. In the present invention, first, precious metal complexes that contain an organic matter are supported on a porous carrier comprised of a metal oxide. The composite complexes are formed by mixing a precious metal salt and an organic matter in an aqueous solution. As the mixing method, can be employed any of the following methods: a method in which an organic matter is added to an aqueous solution of a precious metal salt; a method in which a precious metal salt is added to an aqueous solution of an organic matter; and a precious metal salt and an organic matter are added to water simultaneously.

Organic matters used for complex formation are preferably those having carboxyl, amino, sulfo, phosphate, silicate or borate groups, and preferably those having a molecular weight of 1000 or more and more preferably high-molecular weight organic matters having a molecular weight of 2000 to 30000. Specific examples of such organic matters include polyacrylic acid, poly(N-vinyl-pyrrolidone) and polyethyleneimine.

Precious metal salts applicable to the composite complex formation, particularly to the formation of composite complexes containing platinum include: hexachloroplatinic acid, dinitrodiamineplatinum, dinitrodiamineplatinum nitrate, cis-diaminediaquaplatinum nitrate, trans-diaminediaquaplatinum nitrate, tetranitroplatinic acid, tetra(oxalate)platinic acid, cis-dinitrodiaquaplatinum, tetraamineplatinum hydroxide, hexaamineplatinum hydroxide, tetraamineplatinum chloride, hexaamineplatinum chloride, hexahydroxyplatinic acid, platinum oxide, platinum(I) chloride, platinum (II) chloride and potassium tetrachloroplatinate.

Precious metal salts applicable to the formation of composite complexes containing palladium include: palladium chloride, tetranitropalladic acid, palladium nitrate, dichlorodiaminepalladium, tetraaminepalladium nitrate, tetraaminepalladium chloride, tetraaminepalladium hydroxide, trans-diaquadiaminepalladium nitrate, dinitrodiaminepalladium, bis(ethylenediamine)palladium nitrate and diaqua (ethylenediamine)palladium nitrate.

Precious metal salts applicable to the formation of composite complexes containing ruthenium include: ruthenium chloride, ruthenium nitrate, tetranitrosyldiaquaruthenium, ruthenium acetate, hexaneamineruthenium nitrate, pentaamineaquaruthenium nitrate, nitrocylpentaamineruthenium nitrate and hydroxonitrosyltetraamineruthenium nitrate.

Precious metal salts applicable to the formation of composite complexes containing rhodium include: rhodium chloride, rhodium nitrate, rhodium acetate, pentaamineaquarhodium nitrate, pentaaminenitrorhodium, triaquarhodium nitrate and hexaamineaquarhodium nitrate.

Precious metal salts applicable to the formation of composite complexes containing gold include: chloroauric acid, potassium cyanoaurate(II), potassium cyanoaurate, tetraaminegold nitrate, tetranitrategold ammonium and diaqua (1,10-phenanthrorine)gold nitrate.

Precious metal salts applicable to the formation of composite complexes containing silver include: silver chlorate, silver nitrate, silver acetate and silver lactate.

Precious metal salts applicable to the formation of composite complexes containing iridium include: hexachloroiridic acid, iridium trichloride, hexanitroiridic acid, tris(oxalate)iridic acid, pentaamineaquairidium nitrate, nitropentaamineiridium nitrite and hexaamineiridium nitrate.

The ratio of a precious metal salt and an organic matter when mixing them in an aqueous solution is preferably such that the ratio of organic matter/precious metal salt is 2 to 50, on the basis of molar ratio. If the ratio is less than 2, the amount of organic matter is so small that a composite complex is formed only partially and there remain precious metal ions in the aqueous solution. The precious metal ions remaining in the solution enter the pores of the carrier, which is disadvantageous to the cluster formation. If the organic matter/precious metal salt ratio is more than 50, the amount of organic matter is so large that precious metal ions cannot be adsorbed on the surface of the carrier.

After completing the composite complex formation, if the resultant composite complex is brought into contact with a metal oxide, which is to be a carrier, the composite complex can be supported on the carrier. In the present invention, any kind of metal oxides can be used for the carrier. In addition to alumina, silica or zirconia, carriers containing ceria, for example, the mixtures of rare earth metal oxides such as ceria-zirconia mixed oxides, ceria-zirconia-yttria mixed oxides are also applicable. The carrier used may contain at least one selected from the group consisting of aluminum, zirconium, silicon, titanium, lanthanum, cerium, neodymium and yttrium. As the method for composite complex loading, any method can be employed; for example, metal oxide powder may be added to a composite complex solution or a composite complex solution may be added dropwise to a metal oxide powder dispersion.

Reductive treatment after composite complex loading is preferably done by adding a reducing agent. Examples of applicable reducing agents include: hydrogen; boron compounds such as sodium boron hydride, dimethylamineborane and trimethylamineborane; alcohols such as methanol, ethanol, propanol and butanol; hydrazine; formic acid; and formalin.

The addition of a reducing agent may be carried out in such a manner as to first filter the complex solution that contains a carrier, recover the carrier on which metal ions are supported, and bring the recovered carrier into contact with the reducing agent. However, preferably the reducing agent is directly added to the complex solution that contains a carrier. Employing this process considerably increases the efficiency of catalyst preparation, because a sequence of steps: complex formation→complex loading→reductive treatment can be carried out in a single solution system. In this case, it is preferable to use a reducing agent with relatively strong reducing power, such as formic acid. Use of a reducing agent with strong reducing power allows the reduction temperature to be lowered and the reduction time to be shortened.

In the present invention, a gas such as hydrogen can also be used as a reducing agent, and reduction can be performed by dry process. Dry reduction process offers the advantage in terms of energy consumption over wet reduction process. Specifically, in wet reduction process, not only powder, but water must be heated at the time of reduction, whereas in dry reduction process, it is only powder that must be heated. Dry reduction process also offers the advantage of being able to use a smaller reactor for reduction.

After completing composite complex loading and reduction, second precious metal ions are supported on the carrier. Preferably, the loading of second precious ions is carried out by impregnating a carrier with a precious metal salt solution. Precious metal salt solutions applicable include the above described solutions of first precious metal salts. Here the description of such solutions will be omitted to avoid repetition. The amount of the precious metal salt solution impregnated into a carrier is preferably such that it allows the weight ratio of precious metal/precious metal salt solution on the carrier to be 0.01 to 10%. If the weight ratio is less than 0.01%, a catalyst is hard to mass produce on a commercially scale, whereas if the weight ratio is more than 10%, a local increase in precious metal ion concentration is caused in a catalyst, resulting in preparation of a non-uniform catalyst. When determining the amount of the precious metal salt solution based on the weight of the carrier used, preferably the weight ration of carrier/precious metal salt solution is 0.01 to 50%. If the weight ratio is less than 0.01%, a catalyst is hard to mass produce on a commercially scale, whereas if the weight ratio is more than 50%, the precious metal ions cannot be dispersed uniformly because a well dispersed slurry cannot be made.

After impregnating a precious metal salt solution into a carrier, the carrier is recovered and dried. The as-dried carrier can be used as a catalyst; however, preferably the dried carrier is calcined in the atmosphere at 300 to 500° C. before used as a catalyst. This calcining is performed to remove water, acids and a reducing agent existing in the catalyst.

As described so far, the catalyst in accordance with the present invention has high initial activity, is capable of maintaining its high activity even in a high-temperature environment, and offers excellent durability. And according to the process of the present invention, it is possible to allow catalyst particles comprised of precious metal to be highly dispersed on a carrier.

DETAILED DESCRIPTION OF THE PREFERRED EMBODIMENTS

Figure 1:
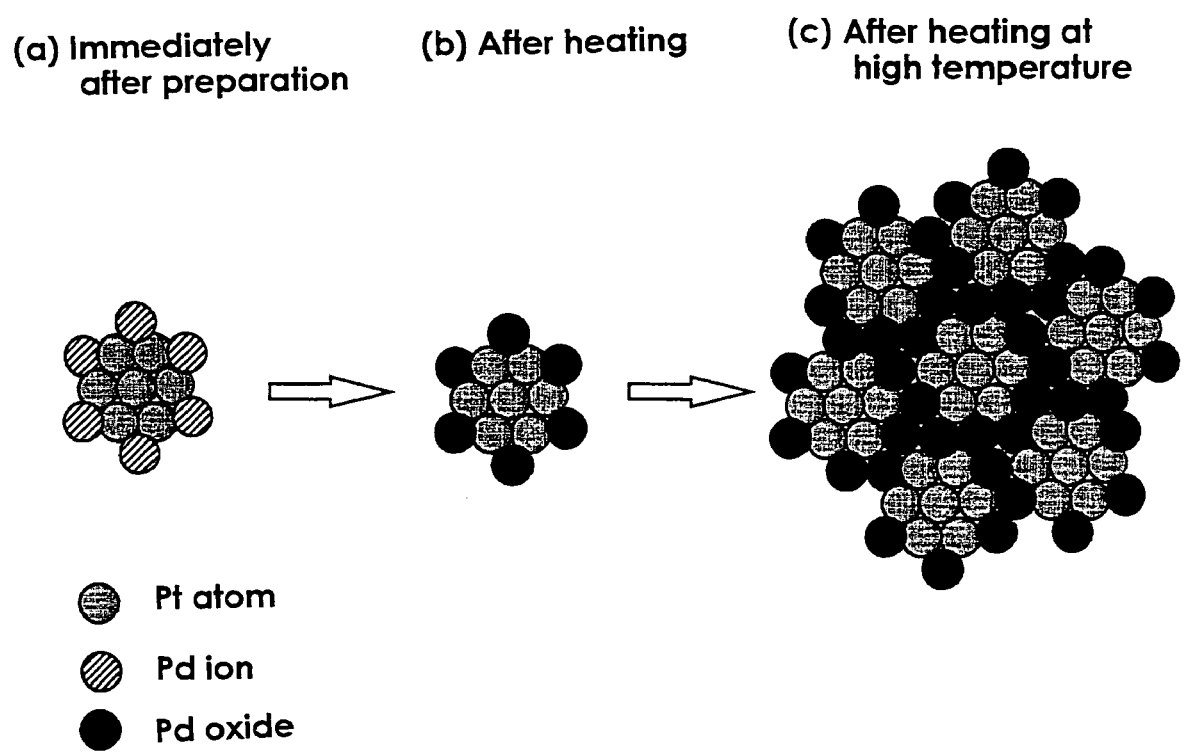
FIG. 1 is a view showing the change in catalyst particles of the catalyst in accordance with the present invention.
Figure 2:
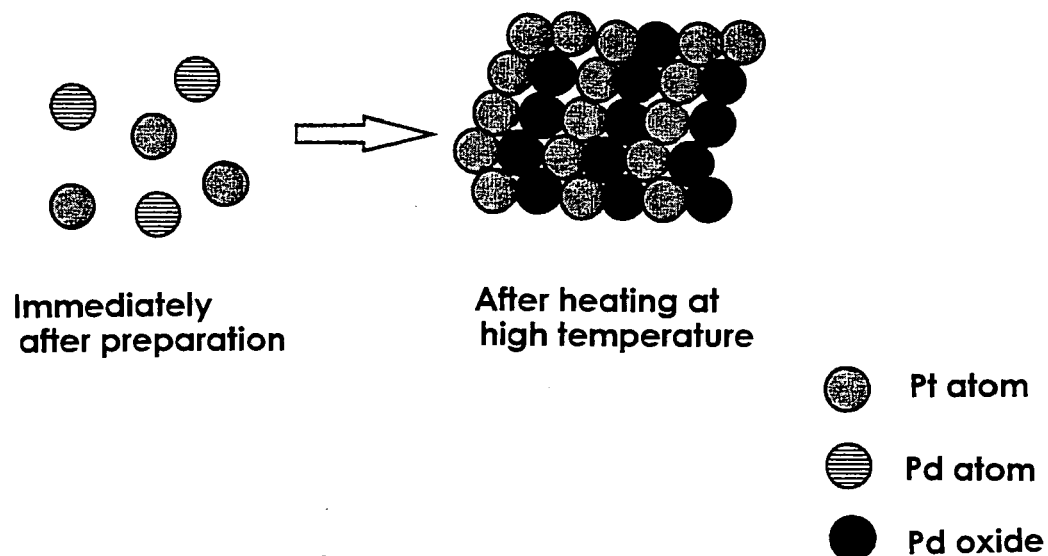
FIG. 2 is a view showing the change in catalyst particles of a conventional catalyst.
Figure 2:
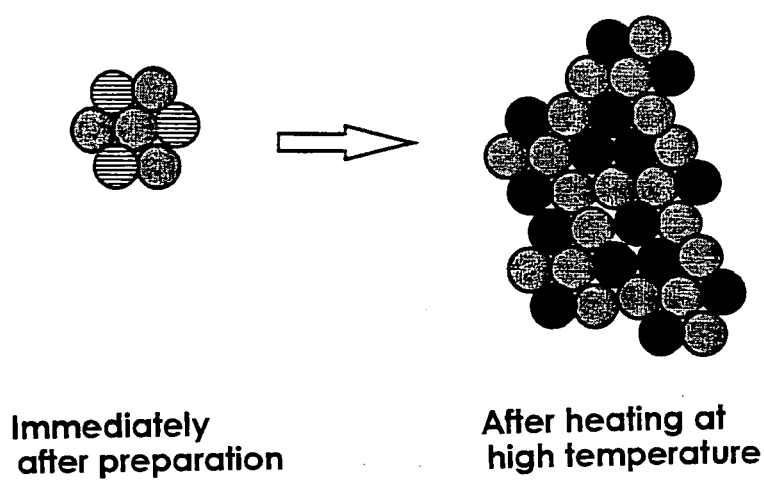

In the following, the preferred embodiments of the present invention will be described with Comparative Examples.

EXAMPLE 1

First, 1.06 g of nitric acid solution of dinitrodiamineplatinum (Pt concentration: 4.588 wt %, Pt amount: 48.6 mg) and a solution of dispersant which was prepared by mixing 0.9 g of solution of polyacrylic acid with average molecular weight of 2000 and 4 mL of water (polyacrylic acid concentration: 40 wt %) were mixed followed by full stirring to prepare a platinum-polyacrylic acid complex solution. Then, a slurry-like solution was prepared in a three-neck flask by dispersing 6 g of γ-alumina powder in 60 mL of deionized water, and the above platinum-polyacrylic acid complex solution was added dropwise to the slurry-like solution. After 30-minute stirring, 15 mL of ethanol as a reducing agent was added to the solution and the mixed solution was refluxed for 6 hours.

After the reductive treatment, 0.249 g of nitric acid solution of dinitrodiaminepalladium (Pd concentration: 4.582 wt %, Pd amount: 11.4 mg) was added dropwise at room temperature and impregnated into the alumina powder so that the platinum complex is supported on the alumina. The carrier after the impregnation with the complex was recovered through filtration, dried at 110° C., followed by calcination in the atmosphere at 450° C. for 2 hours to prepare a platinum-palladium catalyst.

EXAMPLE 2

A platinum-palladium catalyst was prepared in the same manner as in Example 1 except that 15 mL of ethanol as a reducing agent was replaced by 5 mL of formic acid.

EXAMPLE 3

In this example, a composite complex was supported on a carrier at a higher carrier concentration (slurry concentration). 81 g of nitric acid solution of dinitrodiamineplatinum (Pt concentration: 1.0 wt %, Pt amount: 810 mg) and a solution of dispersant which was prepared by mixing 3.6 g of solution of polyacrylic acid with average molecular weight of 2000 and 36 mL of water (polyacrylic acid concentration: 40 wt %) were mixed, followed by full stirring to prepare a platinum-polyacrylic acid complex solution. Then, a slurry-like solution was prepared in a three-neck flask by dispersing 100 g of γ-alumina powder in 200 mL of deionized water, and the above platinum-polyacrylic acid complex solution was added dropwise to the slurry-like solution. After 30-minute stirring, 60 mL of formic acid as a reducing agent was added to the solution and the mixed solution was refluxed for 6 hours.

After the reductive treatment, 19 g of nitric acid solution of dinitrodiaminepalladium (Pd concentration: 1.0 wt %, Pd amount: 190 mg) was added dropwise at room temperature and impregnated into the alumina powder so that the platinum complex is supported on the alumina. The carrier after the impregnation with the complex was recovered through filtration, dried at 110° C., followed by calcination in the atmosphere at 450° C. for 2 hours to prepare a platinum-palladium catalyst.

EXAMPLE 4

In this example, as the organic matter for composite complex formation, polyacrylic acid with a higher molecular weight was used. A platinum-palladium catalyst was prepared in the same manner as in Example 1 except that the polyacrylic acid solution used in Example 1 was replaced by a solution of a dispersant which is prepared by mixing 4 mL of water and 0.36 g of solution of polyacrylic acid with an average molecular weight of 30000.

COMPARATIVE EXAMPLE 1

First, 8.1 g of nitric acid solution of dinitrodiamineplatinum (Pt concentration: 0.6 wt %, Pt amount: 48.6 mg) and 1.9 g of nitric acid solution of dinitrodiaminepalladium (Pd concentration: 0.6 wt %, Pd amount: 11.4 mg) were mixed. Then, a slurry-like solution was prepared by dispersing 6 g of γ-alumina powder in 60 mL of deionized water, and the above mixed solution was added dropwise to the slurry-like solution. After 60-minute stirring, the solution was filtered, dried at 110° C., followed by calcination in the atmosphere at 450° C. for 2 hours to prepare a platinum-palladium catalyst.

COMPARATIVE EXAMPLE 2

A platinum-palladium catalyst was prepared in the same manner as in Comparative Example 1 except that 8.1 g of nitric acid solution of dinitrodiamineplatinum and 1.9 g of nitric acid solution of dinitrodiaminepalladium were replaced by 8.1 g of ethanolamine solution of platinum (Pt concentration: 0.6 wt %, Pt amount: 48.6 mg) and 1.9 g of ethanolamine solution of palladium (Pd concentration: 0.6 wt %, Pd amount: 11.4 mg), respectively.

COMPARATIVE EXAMPLE 3

In this example, a catalyst was prepared with the use of a precious metal colloid (platinum-palladium composite colloid). 11.0 g of nitric acid solution of dinitrodiamineplatinum (Pt concentration: 4.543 wt %), 2.56 g of nitric acid solution of dinitrodiaminepalladium (Pd concentration: 4.582 wt %) and 1.54 g of polyvinyl pyrrolidone (average molecular weight of about 30000) were dissolved in 500 mL of deionized water, and 125 mL of ethanol, as a reducing agent, was dissolved in the above solution. The mixture solution was heated to reflux for 11 hours and filtered through a 0.2 μm membrane, and ethanol was removed from the filtrate with a rotary evaporator to prepare a platinum-palladium composite colloidal solution.

Then, 6 g of the above composite colloidal solution (PtPd concentration 1% by weight, Pt weight 48.6 mg, Pd weight 11.4 mg) was added dropwise to a slurry-like solution prepared by dispersing 6 g of γ-alumina powder in 60 mL of deionized water. After 60-minute stirring, the solution was filtered, dried at 110° C., followed by calcination in the atmosphere at 450° C. for 2 hours to prepare a platinum-palladium catalyst.

Propylene decomposition reaction test was conducted for each of the catalysts prepared as above, and the 50%-conversion temperature was obtained to evaluate the characteristics of each catalyst. The reaction test was conducted with the use of a fixed-bed flow reactor system under the conditions shown below. The test was conducted for the catalysts immediately after the preparation and those having undergone heat treatment at 800° C. for 50 hours. The results are shown in Table 1.

Reaction Test Conditions

Propylene concentration: 500 ppm
Oxygen concentration: 2.6% (Nitrogen Balance)
SV: 20000 h$^{-1}$
Catalyst amount (W/F): 2.0 g-cat·min/L

TABLE 1

| | $C_3H_6$ 50% conversion temperature (° C.) | | |
|---|---|---|---|
| | Immediately after preparation (T1) | After heating at 800° C. (T2) | Deterioration temperature (T2 − T1) |
| Example 1 | 111 | 124 | 13 |
| Example 2 | 118 | 125 | 7 |
| Example 3 | 117 | 127 | 10 |
| Example 4 | 118 | 125 | 7 |
| Comparative Example 1 | 157 | 135 | −22 |
| Comparative Example 2 | 133 | 132 | −1 |
| Comparative Example 3 | 87 | 129 | 42 |

Table 1 indicates that in terms of initial activity, the catalyst of Comparative Example 3, which was prepared with the use of a composite colloid, was best. This catalyst, however, was not good in durability because its activity was significantly lowered after heating at high temperature. The results in Table 1 confirm that in terms of both initial activity and durability after heating, the catalysts of Examples 1 to 4 were superior. The reason that the activity of the catalysts of Comparative Examples 1 and 2 was improved after heat treatment may be that the heat treatment allowed the catalyst particles to move and aggregate, as a result, their particle size became preferable one. However, even in these catalysts, it is expected that their aggregation progresses with heating time; as a result, their activity is eventually lowered. And they were poor in initial activity in the first place, and thus their characteristics are by no means preferable compared with the catalysts of Examples 1 to 4.

Then, the surface area of the precious metal exposed on the catalyst surface was obtained for the catalyst of Example 2 and Comparative Examples 1 and 3 by CO pulse adsorption method. The results are shown in Table 2.

TABLE 2

| Catalyst particles | Surface area of precious metal (m²/g-metal) | |
|---|---|---|
| | Immediately after preparation | After heating at 800° C. |
| Example 2 | Pt cluster/Pd ion | 206 | 19 |
| Comparative Example 1 | Pt ion/Pd ion | 227 | 9 |
| Comparative Example 3 | PtPd cluster | 52 | 16 |

Table 2 shows that the surface area of precious metal was the largest in the catalyst of Comparative Example 1. This is considered ascribable to that fine precious metal particles were dispersed because the catalyst had precious metal ions on its carrier. In contrast, in the catalyst of Example 2, the surface area of precious metal was small since platinum particles took the form of a cluster. And in the catalyst of Comparative Example 3, since all the precious metal particles (platinum, palladium) formed clusters, the surface area was the smallest. When these catalysts were heated at 800° C., the surface area was significantly decreased in the catalyst of Comparative Example 1. This is considered ascribable to that the heat treatment allowed the fine catalyst particles to move and aggregate to form catalyst particles with a larger particle size. The surface area was decreased in the catalysts of Example 2 and Comparative Example 3, as well. In the catalyst of Example 2, the surface area after heating was the largest and the aggregation of catalyst particles seemed to be inhibited, compared with the catalyst of Comparative Example 3. This point will be described in further detail below.

Figure 3:
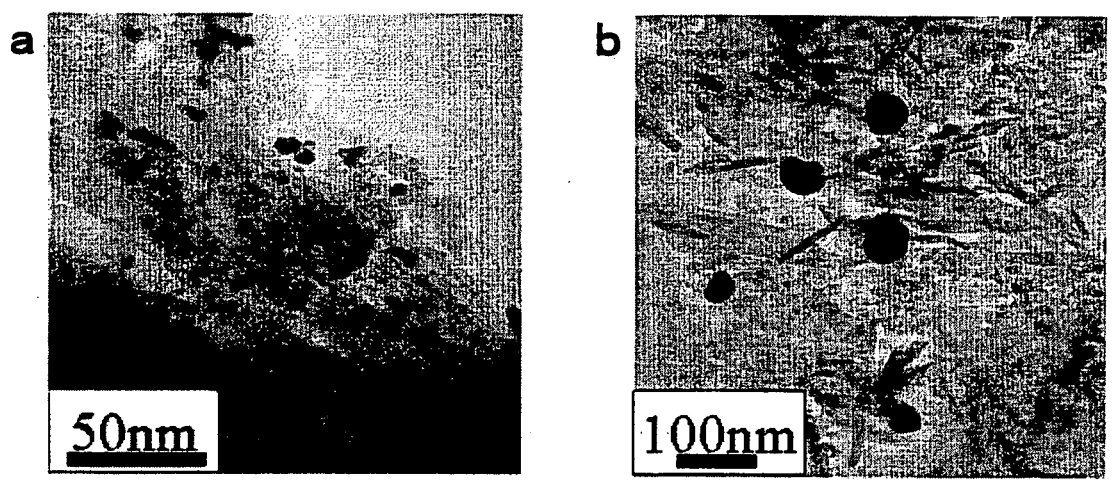
FIGS. 3(A) and 3(B) are images under TEM of the surface of the catalyst of Example 2 immediately after the preparation and after the activity test, respectively.
Figure 4:
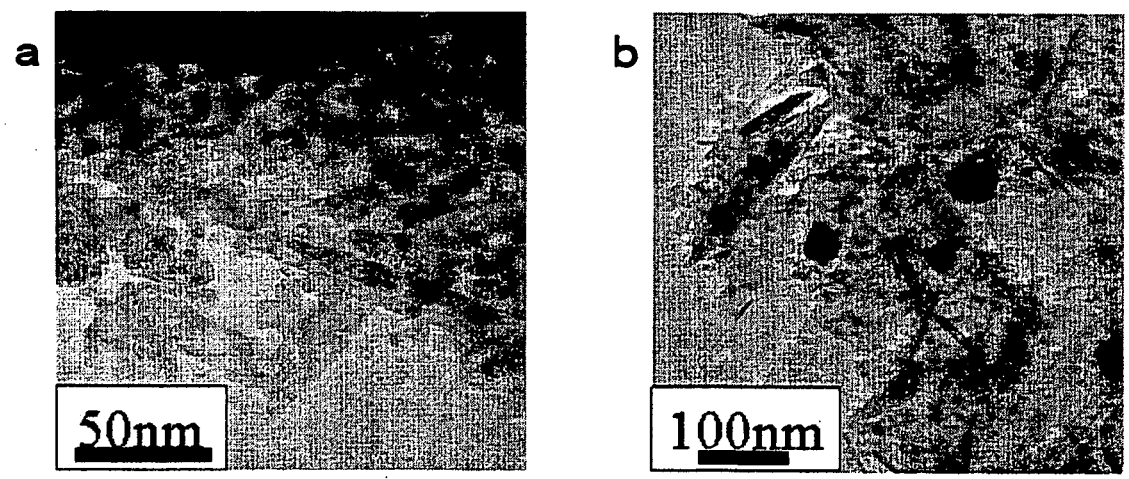
FIGS. 4(A) and 4(B) are images under TEM of the surface of the catalyst of Comparative Example 1 immediately after the preparation and after the activity test, respectively.
Figure 5:
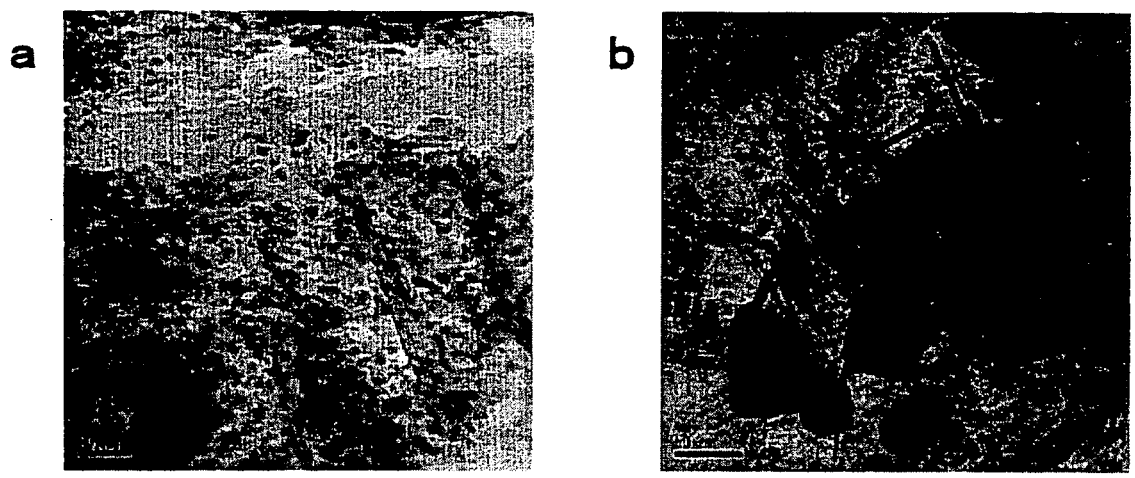
FIGS. 5(A) and 5(B) are images under TEM of the surface of the catalyst of Comparative Example 3 immediately after the preparation and after the activity test, respectively.

FIGS. 3 to 5 show images under TEM of the surface of the catalysts of Example 2, Comparative Examples 1 and 3 immediately after the preparation and after the activity test. In the catalyst of Comparative Example 1 shown in FIG. 4, no catalyst particles are observed in the image of the catalyst immediately after the preparation (FIG. 4(A)). This is because the particle size of the catalyst particles is too small. It is possible to confirm in the image of the same catalyst after the activity test (FIG. 4(B)) that the existence of catalyst particles ranging from 30 to 60 nm in size. In the catalyst of Comparative Example 3 shown in FIG. 5, catalyst particles 2 to 3 nm in size are observed in the image of the catalyst immediately after the preparation (FIG. 5(A)) and it is possible to confirm in the image that the catalyst particles aggregate in spots and are poor in dispersibility. It was also possible to confirm in the image of the same catalyst after the activity test that the catalyst particles aggregated after heating and grew to coarse particles ranging from 60 to 100 nm in size (FIG. 5(B)). In contrast with these catalysts, in the catalyst of Example 1 shown in FIG. 3, catalyst particles ranging from 3 to 5 nm in size are observed in the image of the catalyst immediately after the preparation (FIG. 3(A)) and it was possible to confirm in the image of the same catalyst after the activity test that although the catalyst particles grow after heating, the particle size was no more than 20 to 60 nm, which is smaller than that of the catalyst of Comparative Example 3, and the growth of the catalyst particles was effectively inhibited.

What is claimed is:

1. A catalyst comprising a porous carrier comprising at least one metal oxide, and catalyst particles, each of the catalyst particles comprising a cluster particle formed by an aggregation of a plurality of first precious metal atoms, and a plurality of second precious metal ions bound around the cluster particle, wherein the catalyst particles are carried on the surface of the porous carrier.

2. The catalyst according to claim 1, wherein the particle size of the cluster particle is from 1 to 20 nm.

3. The catalyst according to claim 1, wherein the first precious metal and the second precious metal are different metal species.

4. The catalyst according to claim 1, wherein the first precious metal and the second precious metal are each independently selected from the group consisting of platinum, palladium, rhodium, ruthenium, silver, gold, iridium and osmium.

5. A catalyst prepared by calcining the catalyst of claim 1 at 300 to 500° C., wherein the second precious metal is converted to an oxide and bound around the cluster particle formed by an aggregation of the first precious metal atoms.

6. The catalyst according to claim 1, wherein the diameter of the catalyst particles are larger than the pores diameter of the porous carrier.

7. A process for preparing a catalyst, comprising the steps of:

preparing a metal salt solution that contains a salt of a first precious metal;

dispersing in a solvent the metal salt solution, an organic matter and a porous carrier comprising at least one metal oxide in order to form a composite complex comprising the first precious metal ions and the organic matter which binds to the first precious metal ions, and further to load the composite complex on the porous carrier;

reducing the composite complex-supported carrier to form clustered particles as aggregates of precious metal atoms; and impregnating the reduced carrier with a metal salt solution that contains a salt of a second precious metal to load the second precious metal ions around the clustered particles.

8. The process for preparing a catalyst according to claim 7, further comprising a step of calcining the carrier at 300 to 500° C. after impregnating it with the metal salt solution of the second precious metal salt.

9. The process for preparing a catalyst according to claim 7, wherein the organic matter has at least one group selected from the group consisting of carboxyl, amino, sulfo, phosphate, silicate and borate groups.

10. The process for preparing a catalyst according to claim 7, wherein the organic matter is a polymeric organic matter having a molecular weight of 2000 to 30000.

11. The process for preparing a catalyst according to claim 7, wherein the organic matter is polyacrylic acid, poly(N-vinyl-pyrrolidone) or polyethyleneimine.

12. The process for preparing a catalyst according to claim 7, wherein the reductive treatment is done by adding a reducing agent selected from the group consisting of hydrogen, boron compounds, hydrazine, formic acid, alcohols and formalin to the composite complex-supported carrier.

13. The process for preparing a catalyst according to claim 7, further comprising a step of loading said composite complex on a surface of the porous carrier.

14. The process for preparing a catalyst according to claim 13, further comprising a step of calcining the carrier at 300 to 500° C. after impregnating it with the metal salt solution of the second precious metal salt.

15. A catalyst comprising
a plurality of catalyst particles, each of the catalyst particles comprising
an assembly of a plurality of atoms of a first precious metal, and
a plurality of ions of a second precious metal, arranged substantially on
the external surface of the assembly, and
a porous carrier comprising at least a metal oxide,
wherein the catalyst particles are dispersed substantially on the external surface of the porous carrier, and the plurality of ions of the second metal are located between the assemblies of the plurality of the atoms of the first metal, thereby the assemblies of the plurality of the atoms of the first metal are substantially separated from one another.

16. The catalyst according to claim 15, wherein the diameter of the catalyst particles are larger than the pores diameter of the porous carrier.

* * * * *